United States Patent
Haskara et al.

(10) Patent No.: US 10,988,130 B2
(45) Date of Patent: Apr. 27, 2021

(54) MODEL-PREDICTIVE CONTROL OF A POWERTRAIN SYSTEM USING PREVIEW INFORMATION

(71) Applicant: GM Global Technology Operations LLC, Detroit, MI (US)

(72) Inventors: Ibrahim Haskara, Macomb, MI (US); Chen-fang Chang, Bloomfield Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 212 days.

(21) Appl. No.: 16/249,171

(22) Filed: Jan. 16, 2019

(65) Prior Publication Data

US 2020/0223423 A1 Jul. 16, 2020

(51) Int. Cl.
*B60W 20/12* (2016.01)
*G05B 13/04* (2006.01)
(Continued)

(52) U.S. Cl.
CPC ........ *B60W 20/12* (2016.01); *B60W 50/0097* (2013.01); *G01S 13/931* (2013.01); *G01S 19/13* (2013.01); *G05B 13/048* (2013.01); *B60K 6/20* (2013.01); *B60W 2420/52* (2013.01); *B60W 2420/54* (2013.01); *B60W 2556/60* (2020.02); *B60Y 2200/92* (2013.01); *G01S 2013/9323* (2020.01); *G01S 2013/9324* (2020.01)

(58) Field of Classification Search
CPC ......... B60W 50/0097; B60W 2420/54; B60W 2420/52; B60W 10/06; B60W 10/08; G05B 13/048; G01S 19/13; G01S 13/931; B60K 6/20; B60Y 2200/92
See application file for complete search history.

(56) References Cited

U.S. PATENT DOCUMENTS

| 8,825,243 B2 * | 9/2014 | Yang ..................... B60W 10/08 701/22 |
| 2008/0262712 A1 * | 10/2008 | Duty ..................... B60W 10/06 701/123 |

(Continued)

OTHER PUBLICATIONS

IN 201641002662A; Das et al.; India Invention Application Publication (downloaded from ip.com); "Electronic controller for motor integrated powertrain based vehicle"; Nov. 17, 2017 (Year: 2017).*

(Continued)

*Primary Examiner* — Michael J Zanelli
(74) *Attorney, Agent, or Firm* — Quinn IP Law (57) ABSTRACT

A method for controlling continuous and discrete actuators (e.g., modes) in a powertrain system includes receiving preview information from a sensor(s) describing an upcoming dynamic state at a future time point, and providing control inputs for the actuators to a controller that includes the preview information. The input set collectively describes a future torque or speed output state at the future time point. The controller processes the input set via a dynamical predictive model, in real time, to determine control solutions to take at the present time point for implementing the dynamic state at the future time point. A lowest opportunity cost control solution is determined and optimized. The controller executes the optimized solution at the present time step.

19 Claims, 3 Drawing Sheets

(51) Int. Cl.
*B60W 50/00* (2006.01)
*G01S 19/13* (2010.01)
*G01S 13/931* (2020.01)
*B60K 6/20* (2007.10)

(56) References Cited

U.S. PATENT DOCUMENTS

2010/0030437 A1* 2/2010 Kim ............... F16H 61/0213
701/65
2010/0030447 A1* 2/2010 Smyth ............. B60W 30/188
701/102
2015/0369146 A1* 12/2015 Zavala Jurado ...... F02D 31/001
60/605.2

OTHER PUBLICATIONS

Cairano et al.; Real-time optimization and model predictive control for aerospace and automotive applications; 2018 Annual American Control Conf. (ACC); Wisconsin Center, Milwaukee; Jun. 27-29, 2018; pp. 2392-2409 (Year: 2018).*

Zhang et al.; Role of Terrain Preview in Energy Management of Hybrid Electric Vehicles; IEEE Trans. on Vehicular Tech.; vol. 59, No. 3, pp. 1139-1147; Mar. 2010 (Year: 2010).*

* cited by examiner

MODEL-PREDICTIVE CONTROL OF A POWERTRAIN SYSTEM USING PREVIEW INFORMATION

INTRODUCTION

Powertrain systems generate torque using one or more prime movers and transmit the generated torque to a driven load. For example, an internal combustion engine and/or one or more electric machines may be coupled to a set of drive wheels, a propeller shaft, a pulley system, or another driven load via a planetary gear set arrangement. Multiple actuators are controlled in a typical powertrain system to achieve a desired operating point in terms of torque or speed. The operating point of an engine, for instance, is largely determined by throttle level, fuel injection rate, intake and exhaust valve positions, and camshaft position. Actuators such as these, having a continuously variable output, are commonly referred to in the art as "continuous" actuators.

Certain powertrain system components are capable of operating in discrete modes, such as a particular fixed transmission gear state or a binary on/off operating state of a given prime mover. Some powertrain system configurations are able to increase fuel economy by selectively deactivating a number of the engine's available cylinders. The number of active cylinders, i.e., the particular cylinders that remain actively fueled and fired, is likewise a discrete quantity, and is thus another example of a discrete mode. The optimal selection, timing, and control of such discrete modes in a powertrain system having continuous actuators presents what is referred to in the art as a hybrid control problem.

SUMMARY

As noted above, the hybrid control problem presents itself when one or more continuous actuators of a powertrain system control transitions to or from a discrete mode of operation. Given the vast number of control variables at play in a complex dynamical system such as a powertrain system, it is often difficult to accurately and efficiently calibrate a robust control solution to the hybrid control problem using pre-programmed lookup tables or calibrated mode transition schedules. Mode transition efficiency affects the overall noisiness or "feel" of a given mode transition, i.e., the presence or absence of perceptible torque transients imparted to the powertrain system's driveline during the mode transition.

The present disclosure is therefore directed to improving upon transient torque/power delivery performance and energy management of an example powertrain system when faced with the above-noted hybrid control problem, as well as when discrete mode transitions are not required. The disclosed approach uses a forward-looking future output torque demand to further optimize control over a future window of time, i.e., a "preview window" as set forth herein. In particular, a model-predictive control (MPC) approach is implemented via a controller and a programmed methodology that incorporates preview information from multiple sensors and/or internal or external data sources to enable such predictive forward-looking control functionality.

The use of preview information forms a core part of the disclosed forward-looking MPC strategy in which a future reference point, e.g., a powertrain system torque trajectory that enables a future axle torque demand to be determined at the present moment, and a plant model of the powertrain system, are established and adjusted in real-time in accordance with the preview information. By anticipating future torque demand using a collective set of the preview information supplied from the multiple sensors and/or external systems, the controller is better able to take proactive control actions at the present moment, e.g., to commence preparation for or being execution of a discrete mode transition, well before reaching the future time point. This approach enables faster, smoother and ultimately more efficient powertrain system operation relative to control strategies that assume a constant torque or otherwise enact present control actions based on an instantaneous torque or speed demand.

The sensors that are used as part of the powertrain system collectively provide the preview information in terms of a likely upcoming required dynamic state, e.g., an acceleration/deceleration event of the powertrain system, with such events possibly caused by anticipated changes in elevation, turns, stop-and-go drive patterns, inclement weather indicative of reduced traction and/or heavy braking, etc., over a period of time falling within the preview window. Example sensors include global positioning satellite (GPS) receivers, optical cameras, weather data, traffic information, lidar, radar, or ultrasound data, and/or vehicle-to-vehicle (V2V) or vehicle-to-infrastructure (V2I) sensors. Additionally, some of the resulting computational load incurred by the present method may be offloaded to a remote server, and/or some of the disclosed process steps may be performed autonomously. While a greater number and variety of sensors may be used to provide a more comprehensive set of preview information, some functional embodiments include a limited set of preview information, such as from as few as one sensor/data type.

The controller may use the preview information from the available sensors to estimate a required dynamic state, e.g., future axle torque demand/power demand, over an adjustable, dynamic horizon or preview window, and to forecast a cumulative cost over a duration of the preview window. The controller ultimately derives an optimal solution set of continuous actuators and, in some embodiments, uses the continuous actuators to implement a transition from one discrete mode to another, or simply maintains operation within an existing dynamical state. The controller thus minimizes the projected cost subject to constraints, such as battery state of charge limits and/or driveability.

In an illustrative example implementation, a hybrid electric powertrain system has an engine and an electric machine arranged to deliver torque to a transmission. The torque/speed operating point of the powertrain system may be controlled, possibly to affect a discrete hybrid mode transition or an on/off state of the engine or electric machine. In an engine-off state, for example, the powertrain system is powered solely by an onboard battery pack, e.g., in an electric-vehicle (EV) mode when the powertrain system is used as part of a hybrid electric vehicle. An engine-on state may see the powertrain system powered solely by the engine, or the engine may be used in conjunction with the electric machine. Other example discrete modes may include a number of cylinders being actively fueled and fired at a given engine operating point when the engine is operating in an engine-on state.

Fundamental to the proper implementation of the present control strategy, in addition to use of the above-noted preview information to inform actions over a forward-looking preview window, is the integrated and coordinated use of (i) a dynamical predictive model logic block using look-ahead/preview information of the type noted generally above, (ii) a tunable cost function formulation logic block, and (iii) a real-time optimization logic block.

In an example embodiment, a method for controlling multiple continuous actuators in a powertrain system includes providing control inputs for the multiple continuous actuators to a dynamical predictive model of the powertrain system, with the control inputs collectively describing a desired output state of the powertrain system, and with the control inputs being inclusive of the above-noted preview information. Also input into the dynamical predictive model is the preview information, which is itself indicative of the required dynamic operating state of the powertrain system at the future time point. A torque/power demand trajectory may be derived from the preview information by the controller to determine the required operating state at the future time point, with the future time point falling within the preview window.

The method includes determining, using the dynamical predictive model, a set of possible control solutions for achieving the output state at the future time point. A cost function logic block is used to identify, from among the possible control solutions, a lowest opportunity cost control solution to take at the present time point in preparation for transitioning to the desired output state, e.g., a discrete mode or another speed/torque operating point, at the future time point. The entire process occurs continuously, such that the controller looks ahead to a next future time point, e.g., a calibratable or adjustable interval into the future, considers the required torque trajectory from the preview information, and then adapts a control response to the changing input set in real-time.

The method may additionally include processing the lowest opportunity cost control solution through a real-time optimization logic block of the controller to determine an optimized solution, and thereafter executing the optimized solution via the controller, such as beginning a transition to a discrete mode before the future time point.

The cost function logic block may determine the lowest-cost control solution based on energy efficiency in some embodiments, for example energy efficiency, e.g., fuel economy in a powertrain system that includes an engine, and/or battery efficiency in powertrain systems that include a battery pack. For example, the controller may selectively minimize/discontinue use of the engine while maintaining a desired output torque at a level needed for satisfying the predicted torque trajectory derived from the preview information. Other performance metrics can include drivability and emissions and/or weighted combinations of different desired performance measures.

Processing the lowest-cost control solution through a real-time optimization logic block includes, in some embodiments, using a hybrid solver selected from convex optimization, quadratic programming, and mixed-integer quadratic programming. The hybrid solver may optionally select from the convex optimization, the quadratic programming, and the mixed-integer quadratic programming options based on a load and a speed of the system.

Also disclosed is a system having multiple continuous actuators. The actuators may be optionally configured to achieve the discrete modes of operation in some embodiments. At least one sensor provides the above-noted preview information, and a controller is configured to use the preview information in the method as set forth above.

The above-noted features and advantages and other features and advantages of the present disclosure are readily apparent from the following detailed description of the best modes for carrying out the disclosure when taken in connection with the accompanying drawings.

The present disclosure is susceptible to various modifications and alternative forms, and some representative embodiments have been shown by way of example in the drawings and will be described in detail herein. However, novel aspects of the disclosure are not limited to the particular forms illustrated in the appended drawings. Rather, the disclosure is to cover modifications, equivalents, combinations, and/or alternatives falling within the scope of the disclosure as defined by the appended claims.

DETAILED DESCRIPTION

Figure 1:
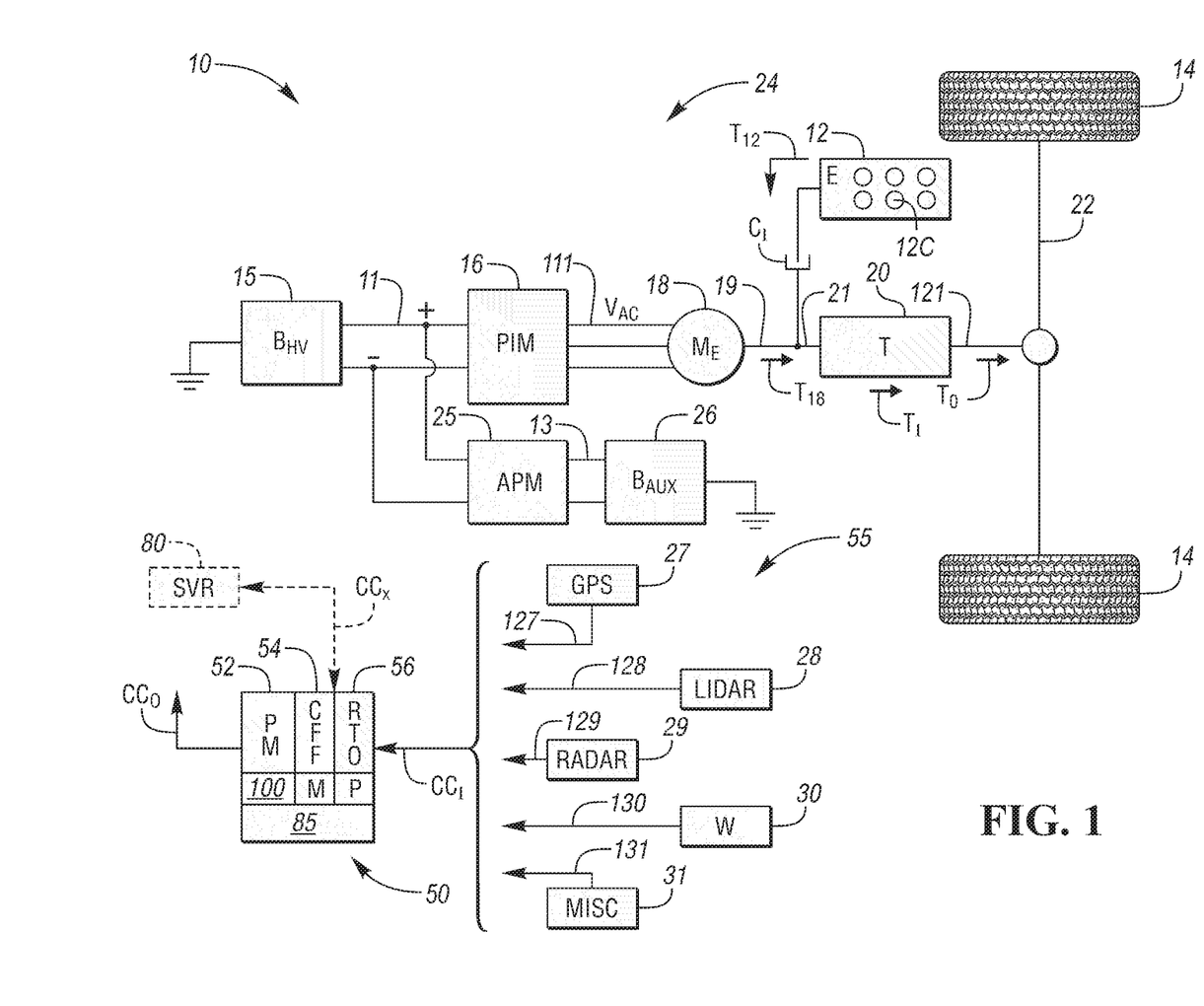
FIG. 1 is a schematic illustration of an example powertrain system and a mode-based predictive (MPC) controller used as part of an example hybrid electric vehicle, with the MPC controller providing a forward-looking model-based hybrid control architecture utilizing preview information as set forth herein.

Referring to the drawings, wherein like reference numbers refer to the same or like components in the several Figures, an example system is depicted in FIG. 1 in the form of a powertrain system 24 used aboard a vehicle 10. For illustrative consistency, the vehicle 10 will be described below with reference to the various Figures as an example application. However, the present teachings may be advantageously applied to other dynamical systems having a similar powertrain system 24, in this instance a powertrain system 24, including vehicles other than the illustrated motor vehicle 10, e.g., watercraft, aircraft, or rail vehicles, etc., as well as robots, platforms, and other mobile systems.

The powertrain system 24 in the implementation of FIG. 1 is a hybrid electric version of the powertrain system 24, and therefore includes an internal combustion engine (E) 12 having a plurality of engine cylinders 12C, within each of which is positioned a reciprocating piston (not shown). The powertrain system 24 also includes at least one electric machine (ME) 18, e.g., an electric traction motor, a transmission (T) 20, and a controller 50, the latter of which is configured to regulate operation of the powertrain system 24 using model-predictive control (MPC). As described below with particular reference to FIGS. 2-6, the controller 50 uses a forward-looking/predictive model-based approach and preview information from a set of sensors 55, i.e., physical sensors and/or data sources, to forecast future model parameters and schedule upcoming control actions and possibly resulting mode changes or speed/torque operating points. The controller 50 then finds an opportunity cost-optimized solution to the above-noted hybrid control problem, executing control actions at the present time that will have the lowest cost at the future time point or lowest cumulative cost over an adjustable preview window as explained below.

The cost of the various possible solutions may be weighted by particular factors of importance, such as a fuel economy tradeoff relative to torque performance of the engine 12 and/or the electric machine 18. That is, the controller 50 may be configured to automatically transition between discrete modes of operation of the powertrain system 24 at the future time point, and to determine precisely when to initiate such a transition, doing so using blended control of one or more continuous actuators in a manner informed by preview information from the sensors 55. Such control actions may be taken even without a mode transition. As a desired control result, the overall efficiency and feel of the transition between discrete modes is improved, or more efficient operation at the future operating point is provided, relative to existing lookup table or ad-hoc programming approaches, with a resultant reduction in noise, vibration, and harshness during the transitions.

In an example illustration, the engine 12 shown schematically in FIG. 1, as understood in the art, may have various continuous actuators in the form of throttle, fuel injectors controlling the fuel injection quantity, cam position, and/or variable valve position and lift on the intakes and exhaust of the various cylinders 12C of the engine 12. A discrete mode for the purposes of illustration may be an on/off running state of the engine 12, electric propulsion modes, as well as the number of cylinders 12C being fueled and fired, i.e., the number of active cylinders 12C and different sets of valve lifts. Other discrete modes may be envisioned within the scope of the disclosure, including a fixed gear state of the transmission 20, e.g., $1^{st}$gear, $2^{nd}$gear, $3^{rd}$gear, etc. Operation of the controller 50 is described in further detail below with reference to FIGS. 2-6.

Further with respect to the example powertrain system 24 of FIG. 1, the engine 12 may be selectively connected to the transmission 20 via an input clutch ($C_I$), such as a friction clutch or a hydrodynamic torque converter assembly. Firing of the engine cylinders 12C generates engine torque (arrow $T_{12}$), with the engine torque (arrow $T_{12}$) transmitted via the input clutch ($C_I$) to an input member 21 of the transmission 20. An output member 121 of the transmission 20 transmits output torque (arrow $T_O$) to one or more drive axles 22, such that the output torque is considered to be axle torque within the scope of the disclosure. The drive axles 22 are coupled to a set of drive wheels 14 in the illustrated example motor vehicle 10 embodiment of FIG. 1. Input torque (arrow $T_I$) into the transmission 20 is thus provided by combinations of the engine torque (arrow $T_{12}$) and motor torque (arrow $T_{18}$) to satisfy a present and future torque demand.

As part of the motor vehicle 10, a high-voltage battery pack ($B_{HV}$) 15 may be electrically connected to a power inverter module (PIM) 16 via positive (+) and negative (−) rails of a high-voltage DC voltage bus 11. The PIM 16 may be controlled via PWM voltage control signals from the controller 50 or another control unit to output an alternating current voltage ($V_{AC}$) via a high-voltage AC voltage bus 111. In turn, phase windings of the electric machine 18 may be energized via the AC voltage bus 111 to generate the motor torque (arrow $T_{18}$) at a continuously variable level via rotation of a rotor 19 of the electric machine 18. The electric machine 18 thus forms another continuous actuator within the context of the disclosure. An auxiliary power module (APM) 25 may be connected to the high-voltage bus 11, and may be configured as a DC-DC converter to output a low/auxiliary voltage via an auxiliary voltage bus 13. An auxiliary battery ($B_{AUX}$) 26 may be connected to the auxiliary voltage bus 13.

In order to perform hybrid blending and control functions using the collective set of preview information from the sensors 55, the controller 50 of FIG. 1 is programmed with a Predictive Model (PM) 52, a Cost Function Formulation (CFF) logic module 54, and a Real-Time Optimization (RTO) logic module 56. The controller 50 receives control inputs (arrow $CC_I$) in real time, including the preview information ($CC_P$), with the controller 50 having a processor (P) and memory (M). The memory (M) includes tangible, non-transitory memory, e.g., read only memory, whether optical, magnetic, flash, or otherwise.

The controller 50 includes sufficient amounts of random-access memory, electrically-erasable programmable read only memory, and the like, as well as a high-speed clock and counter, analog-to-digital and digital-to-analog circuitry, and input/output circuitry and devices, as well as appropriate signal conditioning and buffer circuitry. Execution of instructions 100 enables the controller 50 to automatically generate and transmit output signals (arrow $CC_O$) to the powertrain system 24 to control operation of the engine 12, the electric machine 18, and the transmission 20 in anticipation of future torque or speed demand as predicted from the collective set of preview information provided by the sensors 55. In some embodiments, the controller 50 may be in wireless/radio frequency communication with a remote server (SVR) 80 as indicated by double-headed arrow $CC_X$. For instance, a telematics unit 85 of the controller 50 may be used to establish radio communication with the server 80. In this manner, some of the computational load on the controller 50 incurred by execution of the method 100 may be offloaded to the server 80. The controller 50 may therefore be configured to process the control inputs (arrow $CC_I$) by offloading the processing of the control inputs (arrow $CC_I$) to the server 80, and possibly offloading other computational data as needed.

With respect to the preview information, this collective set of data included in the input signals (arrow $CC_I$) to the controller 50 provides a future reference and associated operating conditions of the powertrain system 24. Example sensors 55 include a global positioning system (GPS) receiver 27 providing GPS information 127, inclusive of upcoming route elevation changes, upcoming turn data, and associated geocoordinates, lidar 28 providing lidar data 128, radar 29 providing radar data 129, a weather sensor 30 providing weather information 130, and miscellaneous sensors (MISC) 31 providing other miscellaneous data 131, with the latter data possibly including cloud-based information, vehicle-to-vehicle (V2V) or vehicle-to-infrastructure (V2I) data, etc.

Rather than assuming a particular future reference, such as by assuming that input torque ($T_I$) or its constituent engine torque ($T_{12}$) and motor torque ($T_{18}$) value or trajectory will remain constant over a particular interval in time, the preview information of the input signals (arrow $CC_I$) from the sensors 55 is instead used to forecast a torque trajectory over an upcoming adjustable preview window, with the window described in more detail below with reference to FIG. 3. The controller 50 also determines required control actions to take at the present time point to affect a desired future result, such as a future required dynamic state and/or a resulting discrete mode change at the future time point. In other words, the control actions taken at the present moment are informed by the effects such control actions will ultimately have at the future time point, with the controller 50 continuously updating itself at every time increment. Using a forecasted model of the powertrain system 24 and operating point information informed by the preview information over the preview window, the controller 50 solves for optimal control inputs to take at a current time step so that the control effect at a future time step is optimized.

Figures 2, 3, 4:
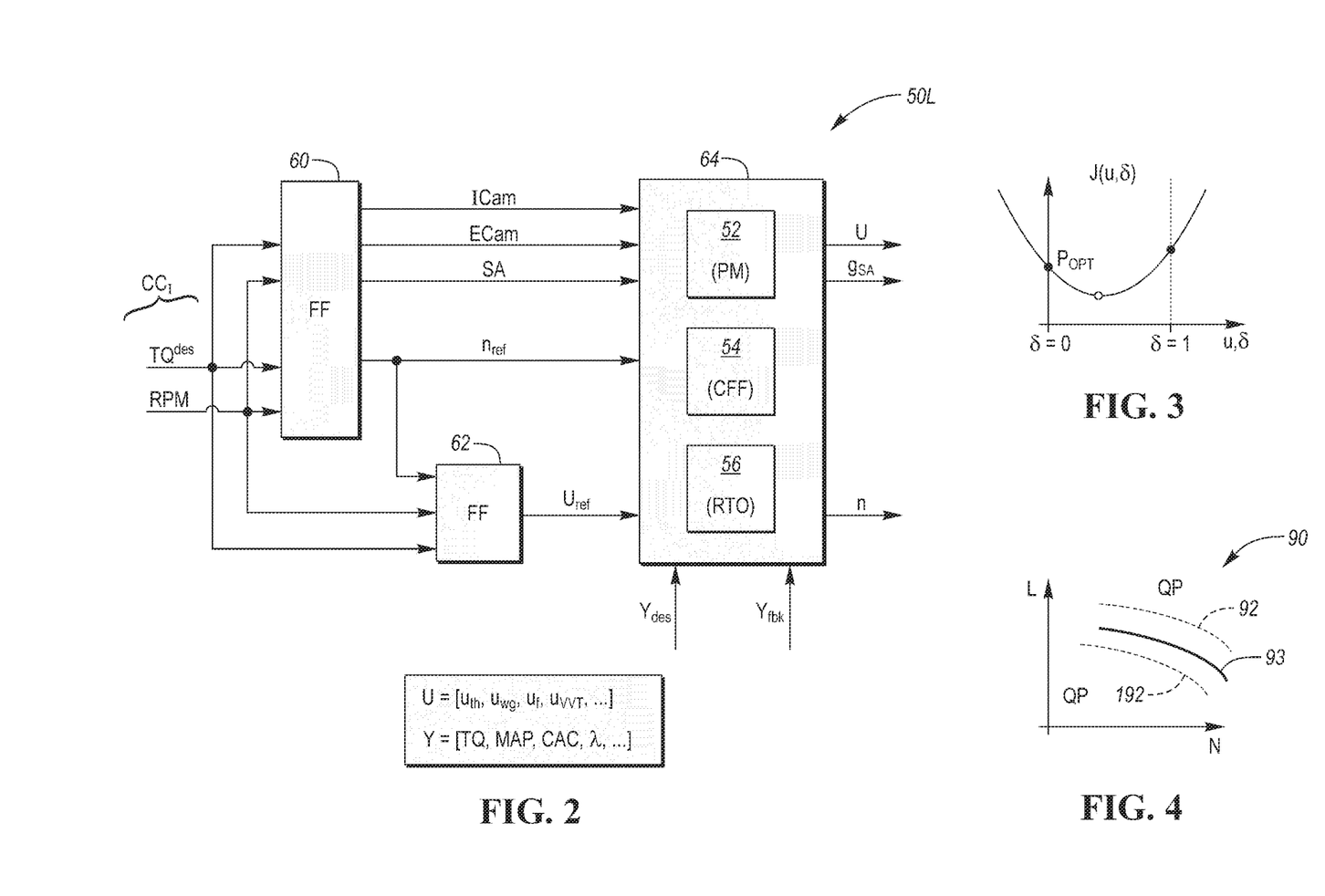
FIG. 2 is a schematic logic flow diagram for the controller of FIG. 1.
FIG. 3 is a schematic depiction of an example optimized solution generated by the controller of FIG. 1.
FIG. 4 is a schematic plot of engine speed (horizontal axis) versus load (vertical axis) depicting a nominal switch map for implementing a hybrid solver function using the controller of FIG. 1.
Figure 5:
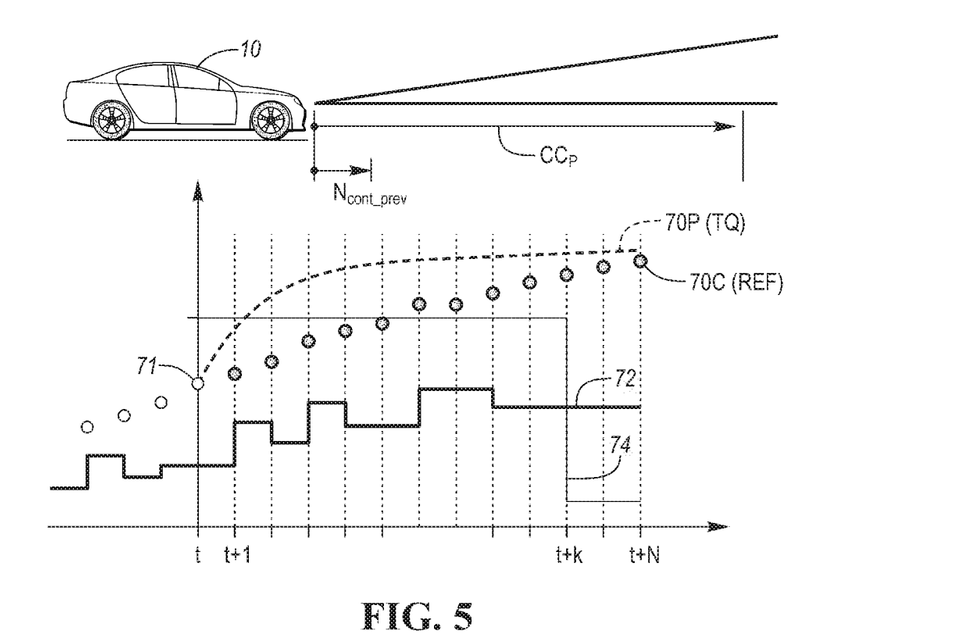
FIG. 5 is a representative time plot of a predicted torque trajectory using preview information for the vehicle shown in FIG. 1.

Referring to FIG. 2, the instructions/method 100 are executed using embedded control logic 50L. The input signals (arrow $CC_I$) into the control logic 50L include the above-noted preview information, i.e., the data 127, 128, 129, 130, and 131 from the sensors 55, which is used to determine a desired future torque ($TQ_{des}$) trajectory and a speed (RPM), e.g., of the engine 12 and/or the electric machine 18 as needed for satisfying the required torque demand at a future time point within the above-noted preview window. The preview information thus shapes a required future torque trajectory, an example of which is shown in FIG. 5 as trace 70P and described in more detail below. The control logic 50L of FIG. 2 may include feed-forward (FF) logic blocks 60 and 62 and a hybrid control (HC) logic block 64. Variables used in the examples set forth in FIGS. 2-6 are non-limiting and intended to demonstrate the present teachings in the context of an exemplary illustration in which the continuous actuators are the engine 12, the electric machine 18, or components thereof.

In such an embodiment, representative control inputs (U) to the engine 12 representative or responsive to a user-requested or autonomously-requested engine torque (arrow $T_{12}$) and/or output torque (arrow $T_O$) may include variables such as throttle ($u_{th}$), waste gate position ($u_{wg}$), fuel timing and quantity ($u_f$), variable valve timing ($u_{VVT}$), and/or other suitable inputs. The manner in which the engine 12 will ultimately respond is captured by a control output set (Y), as values such as torque (TQ), manifold air pressure (MAP), cylinder air charge (CAC), air-fuel ratio (λ), etc. As noted above, different variables may comprise input set U and output set Y for other actuators, e.g., the electric machine 18, and therefore the particular variables shown in the example sets U and Y are non-limiting.

In the exemplary control logic 50L of FIG. 2, the desired torque ($TQ_{des}$) and engine speed (RPM) are derived from the preview information from sensors 55 of FIG. 1, as opposed to being an instantaneously-requested torque/RPM. The input signals (arrow $CC_I$) are fed into the feed-forward logic blocks 60 and 62. From the desired values, the controller 50 determines, e.g., using a lookup table, a corresponding set of output values. For instance, the feed-forward logic block 60 may output timing of intake and exhaust cams (ICam and ECam, respectively) of the engine 12, as well as a spark advance (SA) value, which is also a timing quantity. In an example embodiment in which the discrete mode is a number of active cylinders 12C of the engine 12 shown in FIG. 1, the feed-forward logic block 60 may output a nominal number of active cylinders 12C ($n_{ref}$) required to meet such input demands. From the various input values, the feed-forward logic block 62 may also determine a reference input set ($U_{ref}$), with the reference input set ($U_{ref}$) being example reference values that, absent subsequent use of the hybrid control block 64, the controller 50 would ordinarily expect to command from associated continuous actuators of the engine 12.

Within the flow of the control logic 50L of FIG. 2, the hybrid control logic 64 receives the various lookup table or functional outputs from the feed-forward logic block 60, the reference input set ($U_{ref}$) from the feed-forward logic block 62, and desired and feedback/sensed outputs ($Y_{des}$ and $Y_{fbk}$), respectively. The hybrid control logic 64 ultimately determines and outputs the final set of control inputs (U) to the continuous actuators, e.g., those of the engine 12, and may also output a discrete mode decision (n), with the value of (n) possibly being the on/off state of the engine 12 or the number of active cylinders 12C of the engine 12 in a non-limiting example embodiment, which in turn may be an integer or a fractional value at any discrete moment in time. The hybrid control logic 64 may also output a spark advance gain ($g_{SA}$) as a value between 0 and 1 representative of the amount of spark retard on engine torque, e.g., $g_{SA}$=0.5 leading to a torque reduction of 50 percent.

With respect to the illustrated hybrid control logic 64 of FIG. 2, and using variables that are relevant to a non-limiting example embodiment using the engine 12, the controller 50 of FIG. 1 enacts predictive control of the powertrain system 24 based on real-time optimization, via the RTO module 56, of an opportunity cost function enacted via the CFF module 54, all of which is subject to a dynamic predictive model embodied by the PM 52 and other operating constraints. The PM 52 embodies a dynamical prediction model of the controlled system, in this instance the motor vehicle 10 or the powertrain system 24 of FIG. 1. The PM 52 may be expressed mathematically as follows:

$$\frac{d}{dt}\begin{bmatrix} P_{im} \\ \phi \end{bmatrix} = A(\rho, n_{cyl})\begin{bmatrix} P_{im} \\ \phi \end{bmatrix} + B(\rho, n_{cyl})\begin{bmatrix} u_{th} \\ CFC \end{bmatrix}$$

where A and B are two original system matrices and $n_{cyl}$ is used as a model parameter, i.e., the number of active cylinders 12C. Thus, for an engine-off state, the value of $n_{cyl}$ may be equal to zero. For instance:

$$A_C(\rho) = \begin{bmatrix} \frac{-n_{cyl}V_{cyl}\eta(P_{im}, N, ICam, ECam)N}{120\, V_{im}} & 0 \\ 0 & -\frac{1}{\tau_\lambda} \end{bmatrix}$$

$$B_c(\rho) = \begin{bmatrix} -\frac{\sqrt{R}\, T_{im}P_{amb}N}{\sqrt{T_{amb}}\, V_{im}}\Psi\!\left(\frac{P_{im}}{P_{amb}}\right)A_{th}(P_{im}) & 0 \\ 0 & \frac{AFR_s}{\tau_\lambda CAC_{cyl}} \end{bmatrix}$$

with $\tau_\lambda$ being a time constant, $R_S$ being a gas constant, CFC and CAC being an amount of cylinder fuel charge and cylinder air charge, respectively, $A_{th}$ representing an effective area of throttle, η referring to volumetric efficiency, Ψ being a nonlinear function of the pressure ratio across the throttle, i.e., in the form of an orifice equation, φ being an equivalence ratio, $P_{im}$ referring to intake manifold pressure, $T_{amb}$ being ambient temperature, and $T_{im}$ representing the input manifold temperature. Additionally, N in the above equation is the speed of the engine 12 of FIG. 1, $V_{im}$ is the intake manifold volume, $V_{cyl}$ is the cylinder displacement volume, and $AFR_S$ is the stoichiometric air-fuel ratio. The variable vector ρ defines the set of real-time control data and measurements, e.g., ρ=(N, $P_{im}$, ICam, ECam, $T_{im}$, $P_{amb}$, $T_{amb}$) in keeping with the non-limiting embodiment in which the engine 12 provides the continuous actuators in question. In other words, the original system matrices are parameterized by the variable vector, ρ, which is then updated in real-time. Torque output of the engine 12 may be determined as a function of the above-noted states, including CAC, CFC, SA, and the ρ vector.

A control programming challenge is presented by the above mathematical representations due to the fact that some values, such as the number of cylinders ($n_{cyl}$), may not show up as a control input per se, but remains a parameter affecting system dynamics. Instead, the number of active cylinders 12C may be determined in real time as a mode decision using the hybrid logic module 64. Thus, model reformatting may be performed using analytical or linearization to introduce the relationship of $n_{cyl}=1+n_{cyl,B}$ in order to transform the above equation into the following equation, with the value $n_{cyl,B}$ thereafter acting like a control input:

$$\frac{d}{dt}\begin{bmatrix} P_{im} \\ \phi \end{bmatrix} = \overline{A_c}(\rho)\begin{bmatrix} P_{im} \\ \phi \end{bmatrix} + \overline{B_c}(\rho)\begin{bmatrix} u_{th} \\ CFC \\ n_{cyl,B} \end{bmatrix}$$

Thus, system matrices with the number of active cylinders 12C ($n_{cyl}$) now transformed to the input realm may be expressed as follows:

$$\overline{A_c}(\rho) = \begin{bmatrix} -\frac{V_{cyl}\eta(P_{im}, N, ICam, ECam)N}{120\,V_{im}} & 0 \\ 0 & -\frac{1}{\tau_\lambda} \end{bmatrix}$$

$$\overline{B_c}(\rho) = \begin{bmatrix} -\frac{\sqrt{R}\,T_{im}P_{amb}N}{\sqrt{T_{amb}}\,V_{im}}\Psi\left(\frac{P_{im}}{P_{amb}}\right)A_{th}(P_{im}) & 0 & -\frac{V_{cyl}\eta(P_{im}, N, ICam, ECam)N}{120\,V_{im}} \\ 0 & \frac{AFR_s}{\tau_\lambda CAC_{cyl}} & 0 \end{bmatrix}$$

While the number of cylinders 12C is described as an output to be determined by the controller 50 in this instance, quasi-hybrid solutions may enable active cylinder deactivation if such a switching decision is predetermined. In such an embodiment, the number of cylinders 12C may be used as a control input.

With respect to the cost function formulation (CFF) module 54 of FIG. 2, this logic block establishes a calibratable cost tradeoff when managing torque of the powertrain system 24 of FIG. 1 with enforced fuel economy optimization, and thus acts as an integrated mode decision tool and discrete mode switch. The CFF module 54 establishes a unique cost function (J), e.g., $$J = \sum_t^{t+N}[e_p^T e_p + (u - u_{ref})^T R(u - u_{ref}) + FE]$$

The controller 50 thus seeks to minimize the cost J and combine torque tracking with the entire set of control inputs, including in this example the number of cylinders ($n_{cyl}$) and fuel economy (FE). Part of the above cost function is a predicted error ($e_p$) in vector form and its transpose (T), i.e., $e_p^T$:

$$e_p = W(z^{-1})[Y_{ref,(k\ldots,\,k+Npreview)} - Y_{fbk}]$$

with $W(z^{-1})$ being a dynamic design parameter/filter to smooth the error vector $[Y_{ref}-Y_{fbk}]$, which in turn is the difference between the desired outputs (based on future references) and the measured outputs. Thus, the CFF module 54 factors future torque demand (time t to time t+N) into the cost and control references within a given forward-looking prediction horizon of size N. The deviation of the final control input vector, u, from its corresponding nominal reference values, denoted by $u_{ref}$, are also captured in the overall cost function, J.

With respect to fuel economy (FE) in particular, and in keeping with the non-limiting example embodiment of control of the engine 12 in an illustrative active cylinder deactivation scenario, ideally the CFF module 54 seeks to minimize CAC or $n_{cyl}$ while still providing the same torque from the engine 12 of FIG. 1.

$$FE = f[W_1(z^{-1})CAC, W_2(z^{-1})ncyl, \ldots]$$

with $W_1$, $W_2$, etc., being filters or cost penalties. The CFF module 54 may optionally incorporate switch business penalties, e.g., by penalizing changes in the number of engine cylinders or by using other noise metrics as additional terms in the cost function.

Still referring to FIG. 2, the real-time optimization (RTO) module 56 embodies a real-time optimizer and thus is configured to determine an optimal future control sequence for minimizing the cost function (J) described above. In other words, the RTO module 56 optimizes a particular control set (U) that combines the values for continuous control sequences and discrete mode sequences by minimizing the cost (J) of implementing such a control set. Various options exist for implementing the RTO module 56, including using a base hybrid solver, a dwell-time feature, and a round-off feature.

As will be appreciated by one of ordinary skill in the art, a base hybrid solver may use optimization such as convex optimization, quadratic programming (QP), or mixed-integer quadratic programming (MIQP). For convex solutions sets J(u, δ) in which $\delta \in \{0, 1\}$, such as depicted in FIG. 3, an optimized solution may be represented by point ($P_{OPT}$). The dwell-time feature may include triggering a hybrid solver function around a nominal or default mode switch line 93, as shown in FIG. 4, with such an option possibly reducing computational burden and improving throughput of the controller 50 when executing the functions of RTO module 56. For instance, a hybrid solver may use a map 90 as shown in FIG. 4 which depicts a load (L) on the vertical axis and engine speed (N) on the horizontal axis. The nominal mode switch line 93 may be programmed into memory of the controller 50 and bounded as shown by dashed lines 92 and 192 to provide a zone in which the base hybrid solver, e.g., MIQP, may be used. Outside of the dashed lines 92 and 192, a less computationally burdensome optimization technique such as convex QP may be used.

A third option as noted above, i.e., round-off, may be used to enjoy a substantial throughput savings. Using such an approach, the controller 50 could treat the discrete mode, e.g., $n_{cyl}$, as a continuous function, and thereafter use convex QP across the entire range of the solution set to find an optimal value (without constraining it to be discrete) and to also truncate the resulting optimal value to the closest possible value for application as the discrete mode input.

In another variation, the possible-finite set of forward-looking discrete mode combinations may be enumerated together with identifying the corresponding convex quadratic programming (QP) solutions of the continuous actuators for each possible mode sequence. The solution of the continuous input and discrete mode combination of the lowest cost is then determined as a final control input. By way of example, consider the case of two possible discrete modes, such as the number of active cylinders $n_{cyl}$. With a prediction horizon of size N, there are $2^N$ possible ways that a mode-change sequence can occur. Enumeration in this context means, for both cases, running QP for the remaining continuous actuators and selecting the solution with the lowest QP result. Two QPs are run with only continuous actuators trying all possible mode combinations, which is two in this example illustration, e.g., $n_{cyl}=\{2$ or $4\}$ if N=1 as an example. Running QP1 gives the first solution (U1) when the number of continuous actuators with the lowest cost assumes $n_{cyl}=2$. QP2 gives the second solution (U2) when the number of continuous actuators with the lowest cost assumes $n_{cyl}=4$. If QP2 is less than QP1, the overall optimal solution would be solution U2.

Referring to FIG. 5, the motor vehicle 10 is shown traveling along a roadway gathering a forward-looking set of preview information ($CC_P$) using the sensors 55, some of which may be positioned outside of the vehicle 10. The preview information ($CC_P$) collectively enables the controller 50 to forecast a torque and/or power demand trajectory over a portion of an upcoming route, and to take control actions within the preview window ($N_{cont\_prev}$). As noted above, the preview information may include data about upcoming acceleration/deceleration events, turns, elevation changes/slopes, stop-and-go drive patterns, inclement weather, etc., which thus allows the controller 50 to build and adjust a forward-looking torque trajectory to feed into the control logic 50L of FIG. 2.

The dynamic control horizon, referred to herein as the preview window and abbreviated $N_{cont\_prev}$ noted above, is selected and adjusted by the controller 50 as part of the method 100. The controller 50 may still receive preview information for events occurring outside of the preview window, e.g., out at t+N in FIG. 5, with the control loop of the method 100 possibly updating the underlying models within the time of the preview window, e.g., at t+1, ..., t+k, etc.

In FIG. 5, using another non-limiting example for illustrative purposes, trace 70P depicts such a reference torque trajectory. Operating point 71 is the current operating point of the powertrain system 24. Trace 70C represents a possible predicted trajectory absent use of the preview information ($CC_P$). Looking at trace 70C, if a mode transition (trace 74) is scheduled to occur at a given torque level of trace 70P, such that the mode transition is required to be fully completed by t=t+k, the assumption of a constant torque trajectory of trace 70C may lead to a less than optimal mode transition. That is, the mode transition to the second mode may not commence until t=t+N, or soon before, which is when completion of the mode transition would be more optimal in terms of fuel economy or smoothness/feel. The controller 50 therefore uses the method 100 to control a set of current inputs (trace 72) based on the preview information ($CC_P$) starting at time (t), and adjusting the underlying system models and prediction results in each time increment (t+1), (t+k), (t+k+1), ... (t+N), so as to minimize a cumulative future cost (J) of the eventual mode switch embodied as trace 74.

The example data of FIG. 5 is further explained with reference to FIG. 6, which illustrates an example implementation of the method 100 in the context of selective engine cylinder deactivation as a possible discrete mode.

Beginning at step S102, the controller 50 receives the present torque (arrow TQ) at time t and begins to construct the future torque trajectory over the forward-looking interval (t+1) using the preview information described above. For example, consider the following:

$$x_{t+1}=A(\rho,n_{cyl})x_k+B(\rho,n_{cyl})u_t$$

$$y_t=C(\rho,n_{cyl})x_k$$

where $y_t$ in this instance represents engine torque and $u_t$ represents throttle level. The controller 50 may determine a closed-loop bandwidth ($m\sigma_b$) and size of the above-noted preview window ($N_{cont\_prev}$). With $y=H(jw)u$, and $H(jw)=C(jw-A)^{-1}B$, the controller 50 may calculate the bandwidth ($\sigma_b$) as follows:

$$\left|H(j\sigma_b)\right|=\left(\frac{1}{\sqrt{2}}\right)|H(0)|$$

The controller 50 thereafter dynamically sizes the prediction horizon/preview window as $$N_{cont\_prev}=\frac{n}{\sigma_b},$$

where n~3-5 in a possible implementation. The method 100 then proceeds to step S104 once the preview window has been sized.

Step S104 includes building the future torque trajectory, i.e., $TQ_{ref}$ corresponding to trace 70P of FIG. 5, within the control preview window from step S102, i.e.,:

$$TQ_{ref}=[TQ_{ref,t},TQ_{ref,t+1},\ldots,TQ_{ref,t+N}]$$

up through the duration of the preview window $N_{cont\_prev}$ sized in step S102. The method 100 then proceeds to step S106. In a more generalized application of electrified propulsion, the above-noted values may be axle torque and/or power demand references.

At step S106, the controller 50 controls the various input references (Urefs) and mode switches over the prediction horizon, i.e., as feed-forward controls computed for the future torque demands from step S104. By way of example:

$$U_{ref}=[U_{ref,t},U_{ref,t+1},\ldots,U_{ref,t+N}]$$

$$n_{cyl,ref}=[n_{cyl,ref,t},n_{cyl,ref,t+1}\ldots,n_{cyl,ref,t+N}]$$

where $U_{ref}$ represents an example set of inputs and $n_{cyl,ref}$ represents an example set of discrete modes. The method 100 then proceeds to step S108. In a more general embodiment of electrified propulsion, the forecasted mode could be an EV mode, e.g.,:

$$EV_{mode,ref}=[EV_{mode,ref,t}\ldots,EV_{mode,ref,t+N}]$$

Step S108 includes forecasting control inputs for use in model prediction within the designated preview window. The prediction model 52 of FIG. 2, for instance, captures behavior of the powertrain system 24 at a future point in time, e.g., at time k+1 when starting at time k. Thus, a future state at time (t+k+1), i.e., $\hat{x}_{t+k+1}$ is defined from above-described matrices A and B as follows:

$$\hat{x}_{t+k+1} = A(\rho_{t+k}, \hat{n}_{cyl,t+k})\hat{x}_{t+k} + B(\rho_{t+k}, \hat{n}_{cyl,t+k})\hat{u}_{t+k}$$

wherein $\hat{u}_{t+k}$ represents a future control action within the above-described preview window, $\hat{n}_{cyl,t+k}$ is the modeled future discrete mode at t+k, and ρ represents (RPM, $P_{im}$, $P_{amb}$, $T_{amb}$, ... ) in a possible embodiment. The predicted output, $\hat{y}_{t+k+1}$, corresponding to set Y in FIG. 2, is represented as:

$$\hat{y}_{t+k+1} = C(\rho_{t+k}, \hat{n}_{cyl,t+k})\hat{x}_{t+k+1}.$$

with the noted variables changing for the electrified propulsion example, e.g., $EV_{mode}$ rather than $n_{cyl}$ at time t+k. The method 100 then proceeds to step S110.

Forecasting of future control inputs ($\hat{u}_{t+k}$) for model prediction within the time horizon of the preview window, $N_{cont\_prev}$, thus involves computation of the various reference inputs corresponding to the future torque demand as determined using the preview information available to the controller 50. Several options exist for such forecasting. For example, the controller 50 may use the reference inputs as the future control input in a feed-forward sense, e.g., the number of cylinders 12C to use based on future torque demand using optimal baseline maps. In this case, ($\hat{u}_{t+k}$)=($u_{ref,t+k}$). Or, the controller 50 may use the optimal control sequence from an immediately-prior MPC QP iteration as described above. In this case, ($\hat{u}_{t+k}$)=($u_{opt,t+k-1}$). Another approach uses the previous-applied control at the current sample and extends it to all future sequences, e.g., ($\hat{u}_{t+k}$)=[$u_t$, ..., $u_t$].

Yet another possible approach in step S108 is the use of dynamic weighting of the input and optimal references noted above in order to speed up the control response. For instance:

$$(\hat{u}_{t+k}) = W_{lead}(z^{-1})u_{ref,t+k} + W(z^{-1})u_{opt,t+k-1}$$

wherein $W_{lead}(z^{-1}) + W(z^{-1}) \cong 1$.

Figure 6:
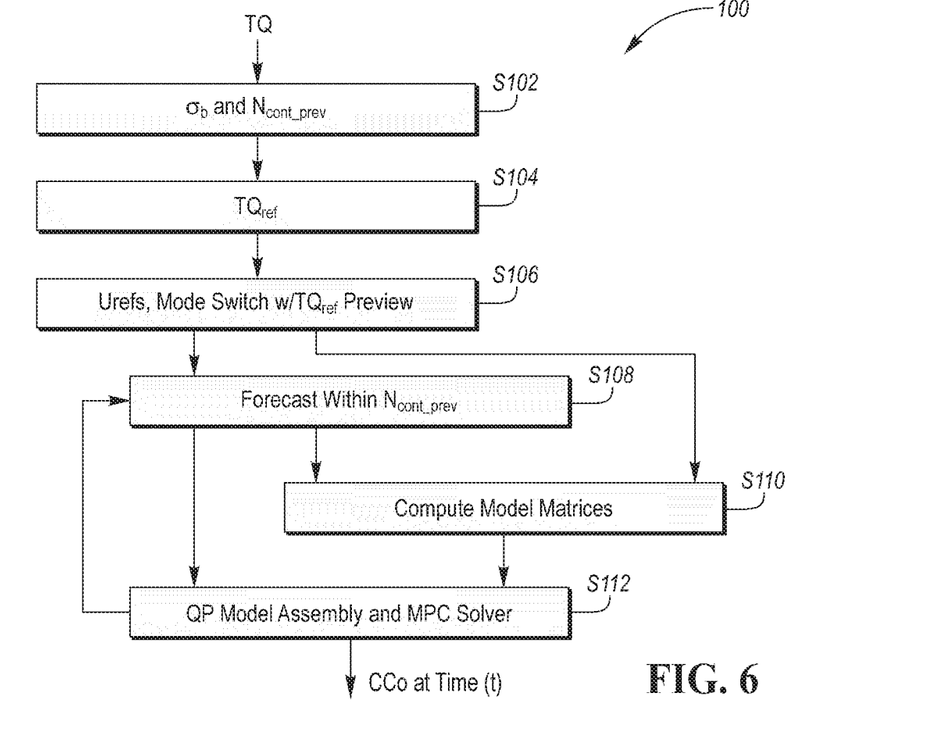
FIG. 6 is a flow chart describing a predictive torque management method incorporating preview information as described herein.

At step S110 of FIG. 6, the controller 50 next computes the model matrices A and B over the preview window, $N_{cont\_prev}$. For instance:

$$A(\rho_{t+k}, \hat{n}_{cyl,t+k})$$

$$B(\rho_{t+k}, \hat{n}_{cyl,t+k})$$

where $$A = \frac{\partial f}{\partial u}\bigg|_{op,t+k} \quad B = = \frac{\partial f}{\partial u}\bigg|_{op,t+k}$$

with ρ=(RPM, $P_{im}$, $P_{amb}$, $T_{amb}$, ... ) in this example, or possibly ρ=($SOC_{15}$, $P_{15}$, etc. ... ) in the hybrid propulsion example. Model matrices can be alternatively represented as nonlinear functions as well.

Step S110 may include updating model parameters and reference inputs at select samples, and maintaining the current model parameters and reference inputs between such select samples for increased computational efficiency. For instance, the reference inputs may be multiplied by a calibratable transition matrix to capture all mode switch instances.

Step S112 may include processing the outputs of steps S108 and S110 through the optimizer (RTO 56 of FIG. 2) to update the underlying system models and derive the final control solution, U. As noted above, this may include using quadratic programming (QP) as part of an MPC solver/control strategy. The final control solution (U) may be implemented using the control signals (arrow $CC_O$) at time (t), with changes occurring at time (t) affecting the result at the future time point as noted above. For the hybrid propulsion example, for instance, the control solution (U) may be defined as: U=[$EV_{mode}$, $T_{12}$, $P_{15}$, $T_{18}$, ... ].

The above approach may be extended to benefit other control results. For instance, one may use the powertrain system 24 of FIG. 1 for predictive propulsion optimization in the context of electrified propulsion, again informed using preview information from the sensors 55. As will be appreciated, electric-drive or EV propulsion modes deliver axle torque through a combination of different sources, and thus the preview information in this instance may include a desired future axle torque or power level. Control variables include the power of the battery pack 15, available torque or power from the engine 12, available torque from the electric machine 18, etc., while discrete actuators may include the particular hybrid operating mode, on/off state of the engine 12, and so forth. Cost may be minimized by the method 100 using a weighted sum of torque/power delivery errors, fuel economy, drivability, or remaining energy in the battery pack 15, by way of example. The future torque demand over the preview window is used to forecast future cumulative costs over the dynamic horizon of the preview window, and to determine the control variables for the current time step that collectively minimize the projects cost subject to constraints, e.g., battery state of charge limits.

From the above disclosure, one of ordinary skill in the art will appreciate that the present method 100 improves upon the state of the art when controlling multiple continuous actuators in non-linear systems, particularly when such actuators are used to transition between discrete modes of operation. Look-ahead preview information is converted into dynamically-changing reference values for each continuous actuator responsible for changing torque or speed of the engine 12 and electric machine 18, with modification via the prediction model used to forecast and make selections in a manner that minimizes a cost associated with each possible control action. A quadratic programming problem may be solved in real time at every time step to find a particular control action having the lowest cost, with the option of using QP or MIQP based on operating point or nonlinear programming. By predicting required actions into the future, the controller 50 is able to consider the effects of control actions before they occur, and thereby provide a mechanism for continuous actuators to start preparing for the future action, e.g., a discrete mode switch.

The present approach, when used to affect the torque or speed output of a set of continuous actuators, thus has attendant benefits such as minimizing torque transients that may otherwise result. In this manner, noise, vibration, and harshness may be minimized in the example powertrain system 24 of FIG. 1 or other systems, with an accompanying reduction in the calibration effort for coordinated torque management. For autonomous applications, since the speed/torque profile is not restricted by driver inputs, autonomous control variables may be used as part of the control logic to optimize drive performance (energy efficiency, drivability, etc. ) using the same forward-looking future demand delivery optimization method disclosed herein. These and other benefits will be readily appreciated by one of ordinary skill in the art in view of the forgoing disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A method for controlling multiple continuous actuators of one or more prime movers in a powertrain system, the method comprising:
receiving, via a controller, a set of preview information from at least one sensor, the set of preview information describing a required future dynamic state of the powertrain system at a future time point;
providing control inputs for the multiple continuous actuators to the controller inclusive of the set of preview information, wherein the controller includes a dynamical predictive model of the powertrain system, and wherein the required future dynamic state collectively describes a future torque or speed output state of the powertrain system at the future time point;
processing the control inputs via the dynamical predictive model, in real time, to determine a set of possible control solutions to implement at a present time point in order to achieve the future torque or speed output state at the future time point;
using a cost function logic block of the controller to identify, from among the set of possible control solutions, a lowest opportunity cost control solution based on predetermined cost criteria;
processing the lowest opportunity cost control solution through a real-time optimization logic block of the controller to determine an optimized solution; and
executing the optimized solution at the present time point via the controller.

2. The method of claim 1, wherein the one or more prime movers include an internal combustion engine and at least one electric machine, and executing the optimized solution includes implementing a hybrid powertrain operating mode using an optimized amount of torque from each of the engine and the at least one electric machine.

3. The method of claim 2, wherein the required future dynamic state requires a discrete mode transition from a first discrete mode of operation to a second discrete mode of operation of the powertrain system, and the discrete mode transition includes an on/off state transition of the engine or the at least one electric machine.

4. The method of claim 1, further comprising: estimating a future axle torque demand/power demand trajectory of the powertrain system over a preview window inclusive of the future time point, forecasting a cumulative cost over the preview window via the cost function logic block, and deriving the optimized solution via the controller in a manner that minimizes the cumulative cost over a duration of the preview window.

5. The method of claim 1, wherein the one or more prime movers include an internal combustion engine, the cost function logic block determines the lowest opportunity cost control solution based on fuel economy of the engine, and the fuel economy is the predetermined cost criteria.

6. The method of claim 1, wherein the control inputs include a future axle torque demand from the one or more prime movers as part of the required future dynamic state.

7. The method of claim 6, wherein the powertrain system is a powertrain system of a motor vehicle.

8. The method of claim 7, wherein the at least one sensor includes a global positioning satellite (GPS) receiver, and the set of preview information includes GPS information indicative of an upcoming route of the motor vehicle.

9. The method of claim 7, wherein the at least one sensor includes a radar system, a lidar system, and/or an ultrasound system, and the set of preview information respectively includes radar, lidar, and/or ultrasound information indicative of an upcoming obstacle.

10. The method of claim 1, wherein processing the lowest opportunity cost control solution through the real-time optimization logic block includes using a hybrid solver method selected from the group consisting of: convex optimization, quadratic programming, mixed-integer quadratic programming, and nonlinear programming.

11. The method of claim 1, wherein processing the control inputs via the dynamical predictive model is conducted via a server that is located remotely from the controller.

12. A powertrain system comprising:
at least one sensor configured to receive a set of preview information describing an upcoming dynamic state of the powertrain system at a future time point;
a plurality of prime movers collectively having multiple continuous actuators; and
a controller configured to:
receive the set of preview information from the at least one sensor;
determine control inputs for the multiple continuous actuators, inclusive of the set of preview information, the control inputs being indicative of a future torque or speed output state of the powertrain system at the future time point;
process the control inputs via a dynamical predictive model to thereby determine a set of possible control solutions to implement at a present time point for implementing the future torque or speed output state at the future time point;
use a cost function logic block to identify, from among the set of possible control solutions, a lowest opportunity cost control solution;
process the lowest opportunity cost control solution through a real-time optimization logic block to determine an optimized solution; and
execute the optimized solution at the present time point.

13. The powertrain system of claim 12, wherein the prime movers include an internal combustion engine and an electric machine, the upcoming dynamic state requires a discrete mode transition from a first mode of operation to a second mode of operation of the powertrain system, and the second mode includes an on or off state of the engine and/or the electric machine.

14. The powertrain system of claim 12, wherein the controller is configured to estimate a future axle torque demand trajectory of the powertrain system over a preview window, forecast a cumulative cost over the preview window using the cost function logic block, and derive the optimized solution in a manner that minimizes the cumulative cost over a duration of the preview window.

15. The powertrain system of claim 12, wherein the prime movers include an internal combustion engine, and the cost function logic block determines the lowest opportunity cost control solution based on fuel economy of the engine.

16. The powertrain system of claim 12, wherein the powertrain system is used aboard a vehicle, the at least one sensor includes a global positioning satellite (GPS) receiver, and the set of preview information includes GPS information indicative of an upcoming route of the vehicle.

17. The powertrain system of claim 12, wherein the at least one sensor includes a radar system, a lidar system, and/or an ultrasound system, and the set of preview information respectively includes radar, lidar, and/or ultrasound information indicative of an upcoming obstacle.

18. The powertrain system of claim 12, wherein the controller is configured to process the lowest opportunity cost control solution through the real-time optimization logic block using a hybrid solver method selected from the group consisting of:
  convex optimization, quadratic programming, mixed-integer quadratic programming, and nonlinear programming.

19. The powertrain system of claim 12, wherein the controller is configured to enable wireless communication with a server located remotely from the controller, and wherein the controller is configured to process the control inputs via a dynamical predictive model by offloading the processing of the control inputs to the server.

* * * * *